United States Patent
Kodama

(10) Patent No.: US 11,048,622 B2
(45) Date of Patent: Jun. 29, 2021

(54) MEMORY SYSTEM

(71) Applicant: TOSHIBA MEMORY CORPORATION, Tokyo (JP)

(72) Inventor: Sho Kodama, Kawasaki Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 0 days.

(21) Appl. No.: 16/549,494

(22) Filed: Aug. 23, 2019

(65) Prior Publication Data

US 2020/0293439 A1    Sep. 17, 2020

(30) Foreign Application Priority Data

Mar. 12, 2019 (JP) .............................. JP2019-044657

(51) Int. Cl.
*G06F 12/02* (2006.01)
*G06F 13/16* (2006.01)
*G06F 13/38* (2006.01)

(52) U.S. Cl.
CPC ...... *G06F 12/0238* (2013.01); *G06F 13/1668* (2013.01); *G06F 13/385* (2013.01); *G06F 2212/401* (2013.01)

(58) Field of Classification Search
CPC ............. G06F 12/0238; G06F 13/1668; G06F 13/385; G06F 2212/401
See application file for complete search history.

(56) References Cited

U.S. PATENT DOCUMENTS

| | | | |
|---|---|---|---|
| 8,880,836 B2 | 11/2014 | Owa | |
| 9,274,706 B2 | 3/2016 | Yeh | |
| 9,501,354 B2 | 11/2016 | Murakami | |
| 2007/0285980 A1* | 12/2007 | Shimizu | G11C 16/0483 365/185.03 |
| 2008/0215800 A1* | 9/2008 | Lee | G07C 9/257 711/103 |
| 2009/0244949 A1* | 10/2009 | Ravasio | G06F 13/385 365/63 |
| 2016/0147482 A1* | 5/2016 | Jang | G06F 12/00 711/103 |
| 2017/0228172 A1* | 8/2017 | Wu | G06F 3/0679 |
| 2018/0276114 A1 | 9/2018 | Kodama | |

* cited by examiner

*Primary Examiner* — Masud K Khan
(74) *Attorney, Agent, or Firm* — Foley & Lardner LLP

(57) ABSTRACT

According to one embodiment, a memory system includes a NAND flash memory that has a first area, a second area, and a third area, and a controller that controls data transfer between a host device and the memory system. The controller writes data transmitted from the host device to the first area by a first method of storing 1-bit data per memory cell, and at a first timing, reads at least a part of data stored in the first area to generate one unit data, compresses the unit data, and writes the compressed unit data to the second area. At a second timing, the controller decompresses the read compressed unit data from the second area, and writes the decompressed unit data to the third area by a second method of storing a plurality of bits of data per memory cell.

10 Claims, 6 Drawing Sheets

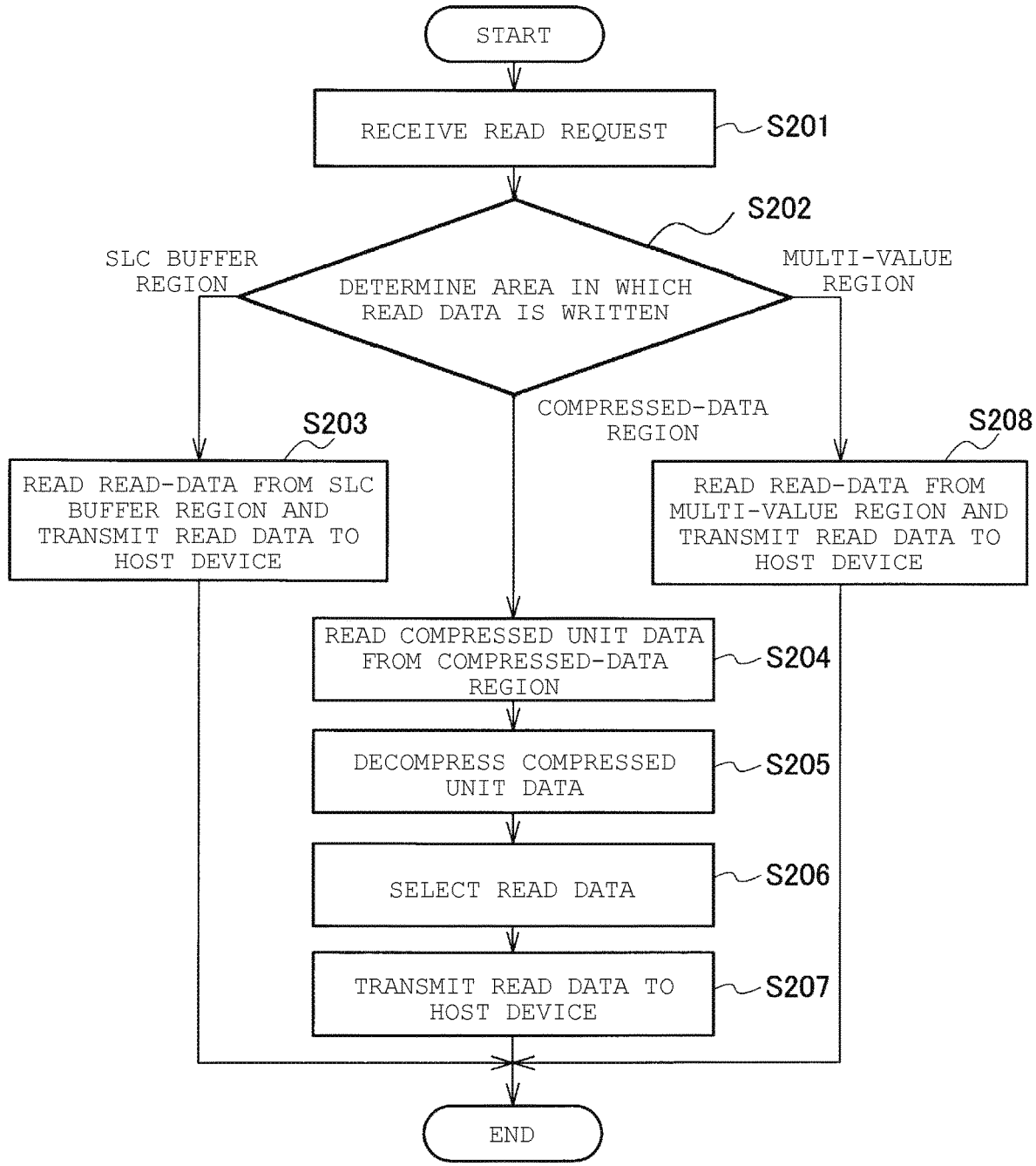

MEMORY SYSTEM

CROSS-REFERENCE TO RELATED APPLICATION(S)

This application is based upon and claims the benefit of priority from Japanese Patent Application No. 2019-044657, filed Mar. 12, 2019, the entire contents of which are incorporated herein by reference.

FIELD

Embodiments described herein relate generally to a memory system that includes a nonvolatile semiconductor memory element.

BACKGROUND

A solid state drive (SSD) is used as a memory system mounted with a nonvolatile semiconductor memory element using multi-value storing technology (hereinafter, referred to as "multi-value method") for storing a plurality of bits in one memory cell. The nonvolatile semiconductor memory element of a multi-value method is, for example, a NAND flash memory. In the memory system such as an SSD, a logical-to-physical address conversion table that indicates a corresponding relation between a logical address designated by a host device and a physical address (storage location) of the nonvolatile semiconductor memory element is used.

In order to improve performance of a memory system mounted with the nonvolatile semiconductor memory element of the multi-value method, there is also a memory system using technology of writing data by a single level cell (SLC) method (also, referred to as a SLC mode) storing 1-bit data in one memory cell. For example, in a memory system using the NAND flash memory of the multi-value method, when a controller that controls the NAND flash memory stores write data transmitted from the host device in the NAND flash memory, data is written to some of blocks of the NAND flash memory (or with finer granularity than a block) by the SLC method to thereby use the blocks as a buffer for write data. An area in which data is written by the SLC mode is also referred to as an SLC buffer region, and the controller moves data written in the SLC buffer region to an area (hereinafter, referred to as a "multi-value region") for storing data by multi-value storing technology at a predetermined timing.

When there is a free area in the SLC buffer region, write performance from the perspective of the host device can be improved to almost the same as performance of a memory system using technology of writing data by the SLC method. For that reason, it is possible to achieve both cost reduction by the NAND flash memory of the multi-value method capable of increasing capacity and improvement of write performance by using the SLC buffer region.

On the other hand, when the free area of the SLC buffer region is not available, data is written to the multi-value region without using the SLC buffer region. For that reason, the write performance from the perspective of the host device is degraded.

An example of related art includes JP-A-2018-160059.

DESCRIPTION OF THE DRAWINGS

FIG. 11 is a flowchart for illustrating the read operation of the memory system according to the embodiment.

DETAILED DESCRIPTION

Figure 1:
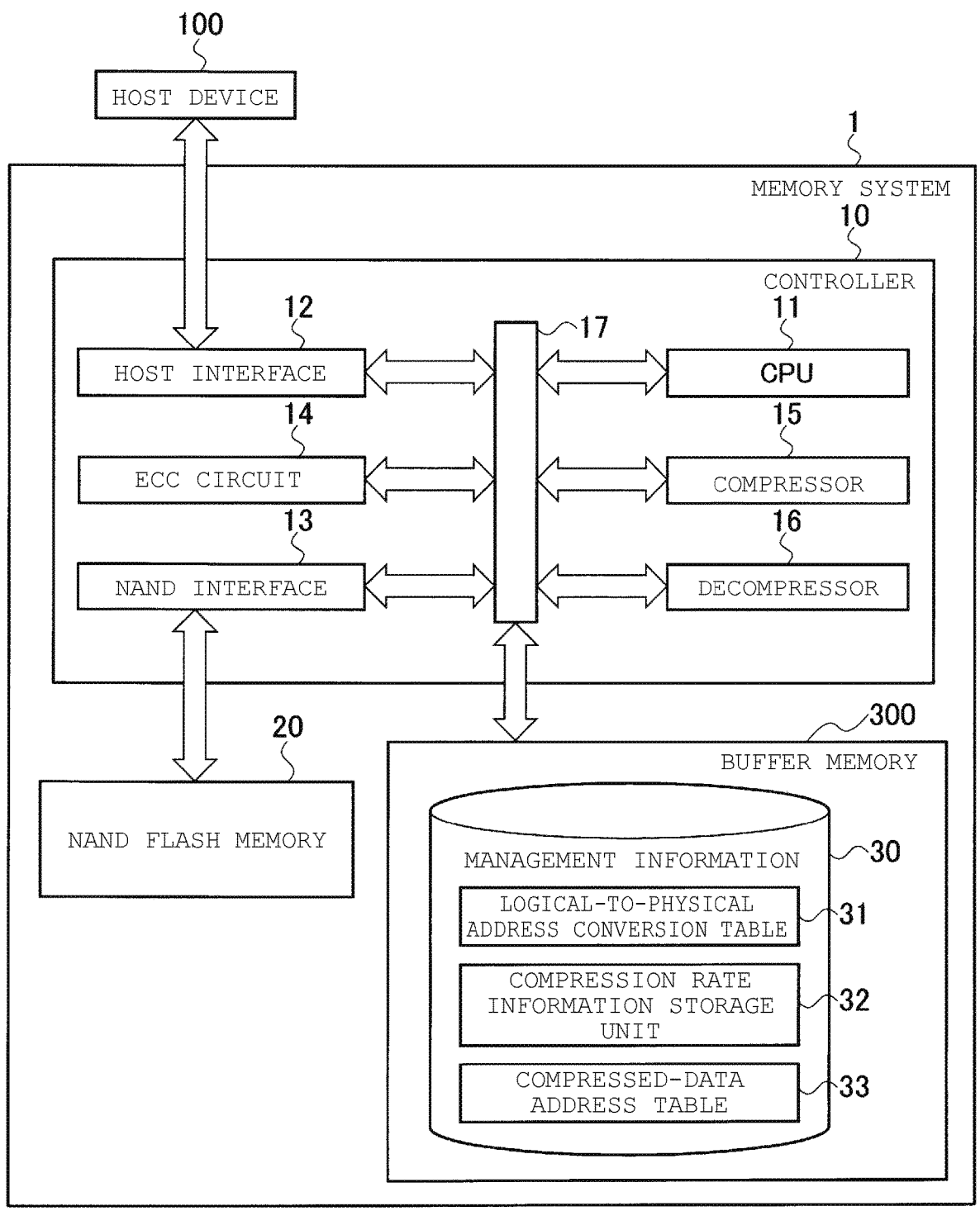
FIG. 1 is a schematic view illustrating a configuration example of a memory system according to an embodiment.

Embodiments provide a memory system having improved performance and including a nonvolatile semiconductor memory element, a part of which is used for an SLC buffer, of a multi-value method.

In general, according to one embodiment, a memory system for use with a host device is disclosed. The memory system includes a nonvolatile semiconductor memory element having a first area, a second area, and a third area, and a controller. The controller writes data received from the host device to the first area by storing 1-bit data per memory cell, and at a first timing, the controller reads at least a part of data stored in the first area to generate one unit data, compresses the unit data, and writes the compressed unit data to the second area. At a second timing, the controller reads the compressed unit data from the second area, decompresses the read compressed unit data, and writes the decompressed unit data to the third area by storing a plurality of bits of data per memory cell.

In the following, an embodiment will be described with reference to the drawings. In the description of the drawings, the same parts will be denoted by the same reference numerals and the description thereof will be omitted.

As illustrated in FIG. 1, a memory system 1 according to the embodiment is a memory system connectable from a host device 100, and includes a controller 10, a NAND flash memory 20 which is the nonvolatile semiconductor memory element of the multi-value method, and a buffer memory 300 in which management information 30 is stored.

The host device 100 may be, for example, an information processing device such as a personal computer, a mobile phone, an imaging device, or a portable terminal such as a tablet computer or a smartphone. Alternatively, the host device 100 may be a game device or an on-vehicle terminal such as a car navigation system. The host device 100 may be a microprocessor mounted on the information processing device, a mobile phone, a mobile terminal, the on-vehicle terminal, or the like. The host device is also referred to as host equipment or host.

The controller 10 controls data transfer between the host device 100 and the NAND flash memory 20. That is, the controller 10 controls a data write operation to the NAND flash memory 20 which is performed according to a write request from the host device 100. The controller 10 controls a data read operation from the NAND flash memory 20 which is performed according to a read request from the host device 100. In the NAND flash memory 20, writing and reading are performed in data units called pages, and erasing is performed in data units called blocks. The write request is also referred to as a write command. When the host device 100 requests the memory system 1 to perform a data write operation, the host device 100 transmits the write command in which a write address and user data are designated to the memory system 1. Here, the user data is write data to the memory system 1 by the host device 100, that is, data designated by the write command transmitted from the host device 100 to the memory system 1, and is also referred to as write data. The read request is also referred to as a read command. When the host device 100 requests the memory system 1 to perform the read operation, the host device 100 transmits the read command in which a read address is designated to the memory system 1.

The controller 10 uses the buffer memory 300 to temporarily store data before storing the data in the NAND flash memory 20. The controller 10 also uses the buffer memory 300 to temporarily store data read from the NAND flash memory 20 before transmitting the data to the host device 100. The buffer memory 300 includes, for example, a general purpose memory such as a static random access memory (SRAM) or a dynamic random access memory (DRAM). The buffer memory 300 may be mounted inside the controller 10 or may be mounted outside the controller 10 independently of the controller 10.

The controller 10 includes a central processing unit (CPU) 11, a host interface 12, a NAND interface 13, an error correcting code (ECC) circuit 14, a compressor 15, and a decompressor 16. These constitutional elements are connected by an internal bus 17.

The host interface 12 executes processing in accordance with an interface standard with the host device 100, and outputs a command, user data, and the like received from the host device 100 to the internal bus 17. The host interface 12 also transmits read data from the NAND flash memory 20, a response from the CPU 11, and the like to the host device 100.

An operation of the memory system 1 is comprehensively controlled by the CPU 11. The CPU 11 controls the operation of the memory system 1 according to a command received from the host device 100 via the host interface 12. The CPU 11 executes firmware for controlling. The CPU 11 performs control by reading firmware (control program) stored in the ROM (not illustrated) onto the buffer memory 300 or the RAM (not illustrated) in the controller 10 when a power is supplied to the memory system. 1 and executing predetermined processing. The contents of control by the CPU 11 in the memory system 1 may be executed by dedicated hardware instead of the CPU 11.

When the CPU 11 receives the write command from the host device 100 via the host interface 12, the CPU 11 controls the ECC circuit 14 to encode user data. Then, the CPU 11 controls the NAND interface 13 so that a code word encoded by the ECC circuit 14 is written to the NAND flash memory 20 as write data. Accompanying the write operation, the management information 30 including information registered in a logical-to-physical address conversion table 31 is updated by the CPU 11.

When the CPU 11 receives the read command from the host device 100 via the host interface 12, the CPU 11 controls the NAND interface 13 to read the code word from the NAND flash memory 20. In this case, the management information 30 is referred to by the CPU 11. Then, the CPU 11 controls the ECC circuit 14 to decode the read code word, and uses the data decoded by the ECC circuit 14 as read data. The CPU 11 controls the host interface 12 to transmit the read data to the host device 100.

The NAND interface 13 performs processing of writing write data, compressed unit data to be described later, the management information 30, and the like to the NAND flash memory 20 under the control of the CPU 11. The NAND interface 13 also performs processing of reading the code word, compressed unit data, management information 30, and the like from the NAND flash memory 20 under the control of the CPU 11.

The ECC circuit 14 performs error correction coding processing on the user data to generate parity. The ECC circuit 14 transmits a code word including the user data and the parity to the NAND interface 13 as write data. Any method may be used for encoding to be performed by the ECC circuit 14. For example, a Reed Solomon (RS) encoding, a Bose Chaudhuri Hocquenghem (BCH) encoding, a low density parity check (LDPC) encoding or the like may be used as an encoding method to be performed by the ECC circuit 14. The ECC circuit 14 conducts error correction decoding processing on the code word transmitted from the NAND interface 13 and transmits the decoded data to the host interface 12 as read data.

The compressor 15 compresses data stored in the NAND flash memory 20, and the decompressor 16 decompresses the compressed data. Details of the compressor 15 and the decompressor 16 will be described later.

The CPU 11 stores data transmitted from the host device 100 and the management information 30 for managing the data in the NAND flash memory 20. At startup or when the read command or the write command is received from the host device 100, a part or all of the management information 30 stored in the NAND flash memory 20 is loaded (cached) into the buffer memory 300. The CPU 11 backs up the management information 30 loaded into the buffer memory 300 to the NAND flash memory 20 at a predetermined timing.

The management information 30 includes the logical-to-physical address conversion table 31, a compression rate information storage unit 32, and a compressed-data address table 33.

The logical-to-physical address conversion table 31 is, for example, mapping data indicating a corresponding relation between a logical address designated by the host device 100 and a physical address of the NAND flash memory 20. The physical address indicates a storage location of the NAND flash memory 20 where the user data is stored. As the logical address, for example, a logical block address to which serial numbers are assigned in sector units is adopted. Here, the sector unit is the minimum unit of the logical address designated by the host device 100.

When managing the logical-to-physical address conversion table 31, the CPU 11 may manage conversion (logical-to-physical address conversion) between logical addresses and physical addresses in sector units, or by allocating a management unit obtained by combining consecutive addresses in the logical address space to a physical area of the NAND flash memory 20. In the management unit, a plurality of sectors having consecutive logical addresses is arranged in order. Although the management unit may have any size, for example, the size of management unit may be made to match a size of a page, a size of a block of the NAND flash memory 20, a size of a file system adopted by the host device 100, or a cluster size that is a multiple of the natural number of two or more of the sector size.

When matching the size of the management unit to the cluster size, the CPU 11 manages the corresponding relation between a logical cluster obtained by collecting consecutive addresses in the logical address space and a physical cluster which is a physical area in the NAND flash memory 20 in which data corresponding to the logical cluster is stored by using the logical-to-physical address conversion table 31.

In the compression rate information storage unit 32, compression rate information including individual compression rates for data to be written to a SLC buffer region 21 to be described later of the NAND flash memory 20 is stored. In the compressed-data address table 33, the logical address of data compressed by the compressor 15, and the top physical address and data length of the NAND flash memory 20 in which the compressed data is written are registered. Details of the compression rate information storage unit 32 and the compressed-data address table 33 will be described later.

Figure 2:
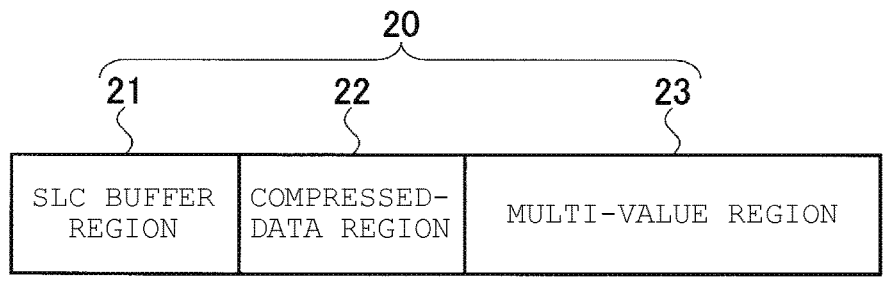
FIG. 2 is a schematic view illustrating a configuration example of a NAND flash memory constituting a memory system according to the embodiment.

The NAND flash memory 20 may be any of a multi-value cell (MLC), a triple level cell (TLC), and a quadruple level cell (QLC). The MLC is a NAND flash memory capable of storing 2-bit information in one memory cell, and the TLC is a NAND flash memory capable of storing 3-bit information in one memory cell. The QLC is a NAND flash memory capable of storing 4-bit information in one memory cell. As illustrated in FIG. 2, the NAND flash memory 20 in the memory system 1 according to the embodiment includes the SLC buffer region 21 to which the controller 10 writes data in the SLC mode, and a compressed-data region 22 to which the data compressed by the decompressor 16 is written, and a multi-value region 23 in which the controller 10 stores data by multi-value storing technology.

Figure 3:
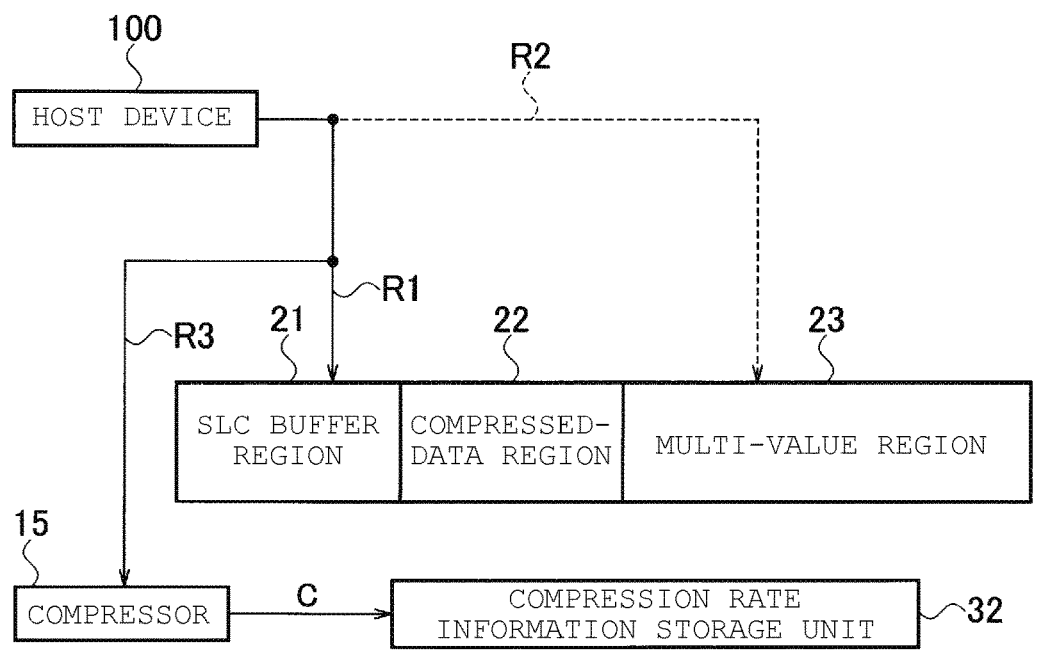
FIG. 3 is a schematic view for illustrating a write operation of the memory system according to the embodiment (first view)
Figure 4:
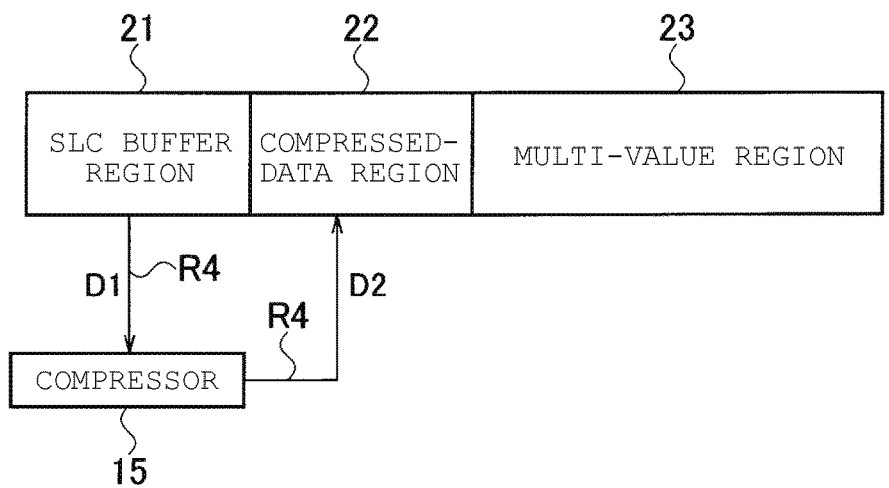
FIG. 4 is a schematic view for illustrating the write operation of the memory system according to the embodiment (second view)
Figure 6:
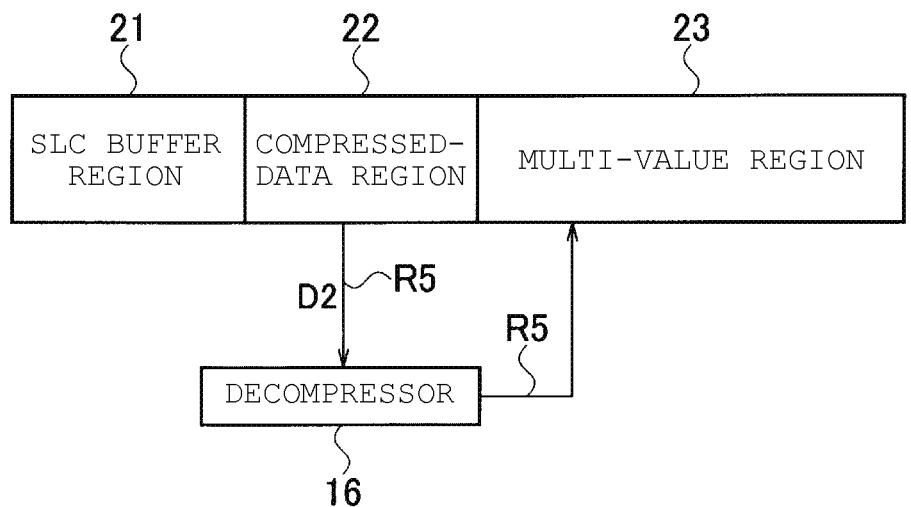
FIG. 6 is a schematic view for illustrating the write operation of the memory system according to the embodiment (third view)

In the following, the operation of the memory system 1 illustrated in FIG. 1 will be described with reference to the schematic diagrams of FIGS. 3, 4 and 6 illustrating a data write method to the NAND flash memory 20.

When there is a free area in the SLC buffer region 21, write data is written to the SLC buffer region 21 of the NAND flash memory 20 as illustrated by a data transfer path R1 in FIG. 3. The "free area" is an area where data is erased or an area where valid data is not stored and can be erased. Here, the "valid data" is data associated with a logical address. On the other hand, when there is no free area in the SLC buffer region 21, the write data is written to the multi-value region 23 of the NAND flash memory 20 as illustrated by a data transfer path R2 with the broken line in FIG. 3.

When the write data is written to the SLC buffer region 21 of the NAND flash memory 20, the write data to be written to the SLC buffer region 21 is also transmitted to the compressor 15, as illustrated as a data transfer path R3 in FIG. 3. Then, a compression rate C when the write data is compressed by the compressor 15 is calculated. The calculated compression rate C is stored in the compression rate information storage unit 32 in association with the write data.

It is not necessary to store the compression rates of all the write data in the compression rate information storage unit 32, and the compression rate C of the write data having a relatively high compression rate may be stored in the compression rate information storage unit 32. For example, the number of compression rates C stored in the compression rate information storage unit 32 may be limited to the number of the top N compression rates with high compression rates C (N is an integer of 1 or more).

When the write requests from the host device 100 are consecutive, the free area of the SLC buffer region 21 is reduced. When there is little free area in the SLC buffer region 21 and there is a free area in the compressed-data region 22, the CPU 11 collects a part or all of a plurality of pieces of write data written in the SLC buffer region 21 to generate single unit data. That is, as illustrated as a data transfer path R4 in FIG. 4, unit data D1 is transmitted from the SLC buffer region 21 to the compressor 15. The compressor 15 compresses the unit data D1 to generate compressed unit data D2. The generated compressed unit data D2 is written to the compressed-data region 22 of the NAND flash memory 20. Transfer of the unit data D1 from the SLC buffer region 21 to the compressor 15 and transfer of the compressed unit data from the compressor 15 to the compressed-data region 22 are performed by the CPU 11 via the internal bus 17.

The compressed-data region 22 may be an area in which data is stored by multi-value storing technology, or may be an area in which data is stored by the SLC method. Each piece of the compressed unit data is written to a sequential area of the compressed-data region 22. Here, the "sequential area" is one physically continuous area in which the storage position in the NAND flash memory 20 can be designated by one physical address and one data size.

As described above, in the memory system 1, unit data that is at least a part of the write data written in the SLC buffer region 21 is compressed and moved to the compressed-data region 22. The CPU 11 performs data invalidation on an area of the SLC buffer region 21 in which write data constituting the unit data is written. With this configuration, a new free area is kept in the SLC buffer region 21.

All or part of the write data written to the SLC buffer region 21 may be compressed. The CPU 11 may select write data constituting the data unit with reference to the compression rate C stored in the compression rate information storage unit 32. For example, the CPU 11 generates unit data by prioritizing write data having a relatively high compression rate. On the other hand, the CPU 11 may exclude write data whose data size is not compressed by the compressor 15 or write data having a low compression rate from the write data for generating the data unit.

The physical address of the NAND flash memory 20 registered in the logical-to-physical address conversion table 31 is any of the physical address of the SLC buffer region 21, the physical address of the compressed-data region 22, and the physical address of the multi-value region 23. Every time the write data is written to the SLC buffer region 21 or the multi-value region 23 and the compressed unit data is written to the compressed-data region 22, the registered contents of the logical-to-physical address conversion table 31 are updated by the CPU 11.

The logical address of the write data in each of the compressed unit data is registered in the compressed-data address table 33. For that reason, for the physical address of the write data in the compressed unit data written in the compressed-data region 22, the compressed-data address table 33 is used to store a correspondence with the logical address.

Figure 5:
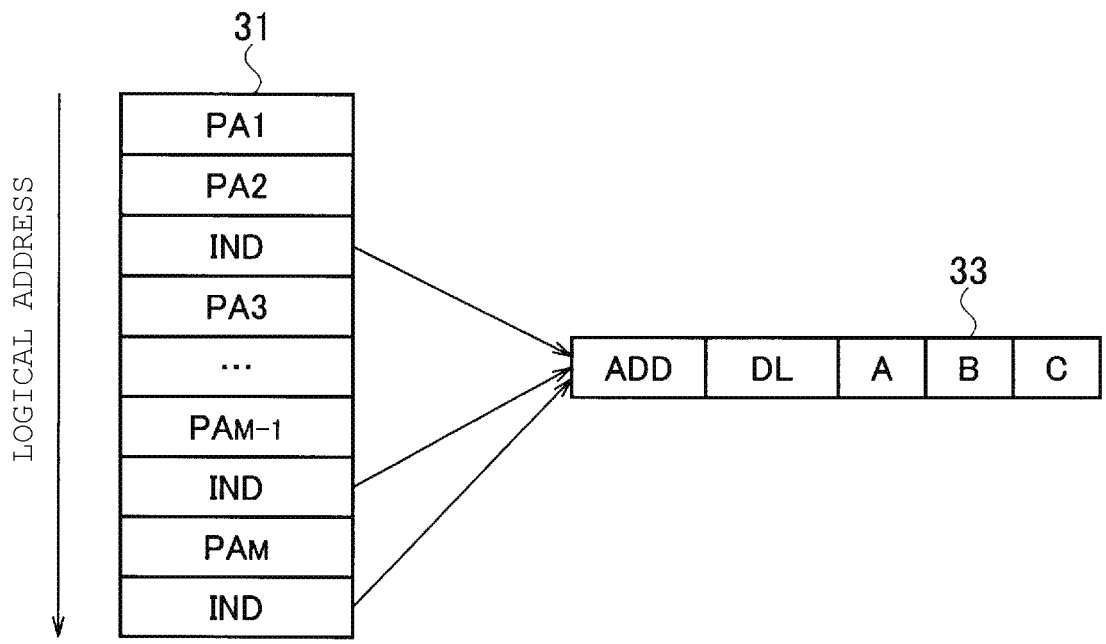
FIG. 5 is a schematic view illustrating a configuration example of a logical-to-physical address conversion table and a compressed-data address table of the memory system according to the embodiment.

For example, as illustrated in FIG. 5, in the logical-to-physical address conversion table 31, physical addresses PA1, PA2, ... PA$_M$ (M is a natural number) are stored in the SLC buffer region 21 or the multi-value region 23. The physical addresses PA1, PA2, ... PA$_M$ correspond to the logical address designated by the host device 100 and indexes IND designating the positions registered in the compressed-data address table 33 of information of the compressed-data region 22 where the compressed unit data is stored are registered. In the logical-to-physical address conversion table 31 illustrated in FIG. 5, the physical addresses or indexes are associated with logical addresses arranged in the direction of the arrow. In the compressed-data address table 33, for example, as illustrated in FIG. 5, a top physical address ADD of the compressed unit data in the compressed-data region 22, a data length DL of the compressed unit data, and logical addresses, A, B, and C of the data in the compressed unit data are recorded. In the example as illustrated in FIG. 5, the number of pieces of data in the compressed unit data is three (which correspond to the logical addresses A, B, and C, respectively). As described above, in the logical-to-physical address conversion table 31, two types of data of the physical address PA and the index IND are mixed. These two types of data are distinguished by using, for example, specific bits.

In the memory system 1, the logical-to-physical address conversion table 31 and the compressed-data address table 33 may be used to determine a physical position of the NAND flash memory 20 corresponding to a specific logical address.

The compressed unit data written in the compressed-data region 22 is transmitted to the decompressor 16 under the control of the CPU 11, as illustrated as a data transfer path R5 in FIG. 6. The decompressor 16 decompresses the compressed unit data, and the write data constituting the unit data is written to the multi-value region 23 of the NAND flash memory 20 in a non-compressed state under the control of the CPU 11. The transfer of compressed unit data from compressed-data region 22 of NAND flash memory 20 to the decompressor 16 and the transfer of write data from the decompressor 16 to the multi-value region 23 of NAND flash memory 20 are performed via the internal bus 17.

Figure 7:
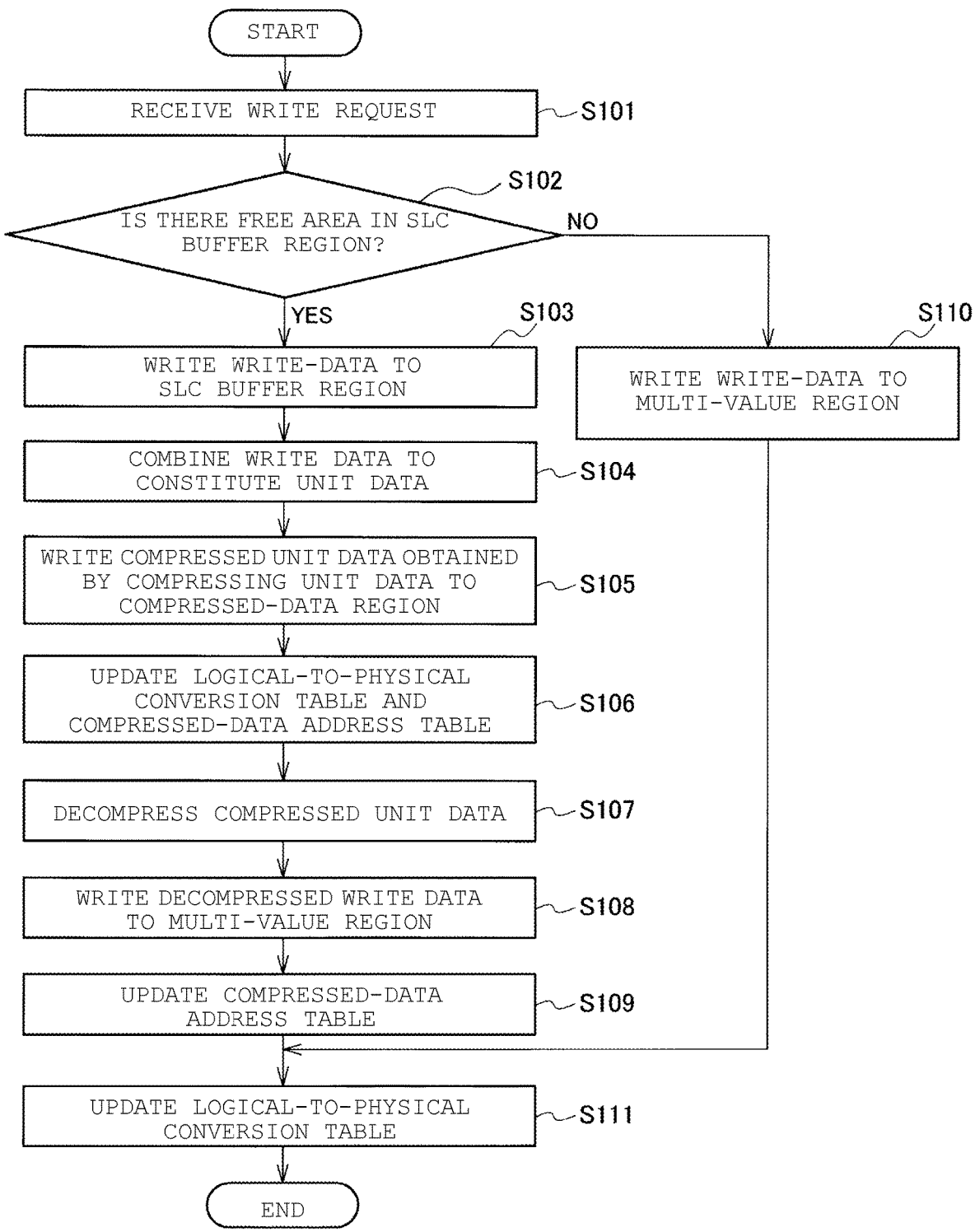
FIG. 7 is a flowchart for illustrating the write operation of the memory system according to the embodiment.

Next, a write operation of the memory system 1 will be described with reference to a flowchart of FIG. 7 illustrating a flow of the write operation. When the memory system 1 receives a write request from the host device 100 in step S101 of FIG. 7, a write command, a write address, and user data are transmitted from the host interface 12 to the CPU 11.

In this case, in step S102, the CPU 11 determines whether or not there is a free area in the SLC buffer region 21. When it is determined that there is a free area in the SLC buffer region 21, a process proceeds to step S103. Then, as described with reference to FIG. 3, the CPU 11 writes the write data to the SLC buffer region 21 of the NAND flash memory 20 (step S103). Thereafter, the process proceeds to step S104. On the other hand, when there is no free area in the SLC buffer region 21, the process proceeds to step S110, and the CPU 11 writes the write data to the multi-value region 23 of the NAND flash memory 20. In this case, in step S111, the CPU 11 updates the logical-to-physical address conversion table 31 so as to associate the logical address of the written data with the physical address of the multi-value region 23. The write data is written to the SLC buffer region 21 or the multi-value region 23 in a non-compressed state.

In step S104 of FIG. 7, when there is little free area in the SLC buffer region 21 and there is free area in the compressed-data region 22, the CPU 11 generates unit data as described with reference to FIG. 4. Then, in step S105, the CPU 11 writes compressed unit data obtained by compressing unit data to the compressed-data region 22.

In this case, in step S106, the logical-to-physical address conversion table 31 and the compressed-data address table 33 are updated by the CPU 11. That is, the top physical address ADD of the compressed unit data newly written in the compressed-data region 22, the data length DL of the compressed unit data, and the logical address of the data in the compressed unit data are registered in the compressed-data address table 33. Then, for the data contained in the compressed unit data written in the compressed-data region 22, the physical address registered in the logical-to-physical address conversion table 31 is updated to the index IND which designates the position of the compressed-data address table 33 in which information of the compressed-data region 22, in which the compressed unit data is written, is recorded.

In step S107 of FIG. 7, the decompressor 16 decompresses the compressed unit data written in the compressed-data region 22 as described with reference to FIG. 6. Then, in step S108, the write data constituting the compressed unit data is written to the multi-value region 23 of the NAND flash memory 20 in a non-compressed state.

When the decompressed write data is written to the multi-value region 23, that is, when the write data is written to the multi-value region 23 in a non-compressed state, the CPU 11 updates the registered contents of the logical-to-physical address conversion table 31 and the compressed-data address table 33. That is, in step S109, the CPU 11 erases information of the compressed-data region 22 in which the decompressed compressed unit data is written from the compressed-data address table 33. Then, in step S111, the CPU 11 updates the logical-to-physical address conversion table 31 so that the logical address of the write data constituting the unit data is associated with the physical address of the multi-value region 23.

The timing (hereinafter, "first timing") at which the write data is compressed and written to the compressed-data region 22 and the timing (hereinafter, "second timing") at which the compressed unit data is decompressed and the write data is written to the multi-value region 23 may be set to any timing. However, in some embodiments, the first timing and the second timing may be configured so that the free area of the SLC buffer region 21 does not run short. For that reason, the write data may be compressed so that a pace of a free area newly kept in the SLC buffer region 21 becomes larger than a pace of the write data to the SLC buffer region 21 of the NAND flash memory 20 based on user data from the host device 100.

The first timing may be set by the CPU 11 according to the free area of the SLC buffer region 21. That is, when a ratio of the free area in the SLC buffer region 21 becomes smaller than a set allowable value, the CPU 11 writes the compressed unit data to the compressed-data region 22. For example, when the ratio of the free area in the SLC buffer region 21 decreases to about 10% of the entire SLC buffer region 21, compression of the write data written in the SLC buffer region is executed. Alternatively, the CPU 11 may execute compression of the write data at the timing when there is little free area in the SLC buffer region 21.

The CPU 11 calculates the compression rate of the write data written to the SLC buffer region 21 at the timing when the write data is written to the SLC buffer region 21. For that reason, the CPU 11 can determine the timing to compress the write data and select the write data to be compressed according to the size required for the free area of the SLC buffer region 21. For example, the CPU 11 may select the write data constituting the unit data according to the size of the free area intended to be newly kept in the SLC buffer region 21.

The second timing may be set by the CPU 11 according to access frequency from the host device 100 or the like. For example, when the access frequency from the host device 100 to the memory system 1 relatively decreases, the CPU 11 decompresses the compressed unit data and moves write data to the multi-value region 23. Alternatively, when the access frequency from the host device 100 becomes smaller than a predetermined setting value, the CPU 11 may decompress the compressed unit data and move the write data to the multi-value region 23.

The CPU 11 moves the write data written in the SLC buffer region 21 without being compressed to the multi-value region 23 at any timing. For that reason, when the free area in the SLC buffer region 21 runs short, the CPU 11 may compress a part or all of the write data of the SLC buffer region 21 and move the compressed write data to the compressed-data region 22.

As described above, in the memory system 1 illustrated in FIG. 1, the write data is stored in any of the SLC buffer region 21, the compressed-data region 22, and the multi-value region 23 of the NAND flash memory 20. In the following, the data read operation of the memory system 1 will be described with reference to schematic diagrams of FIGS. 8 to 10 illustrating an example of the data read operation of the NAND flash memory 20 by the controller 10 when the read request is received from host device 100.

Figure 8:
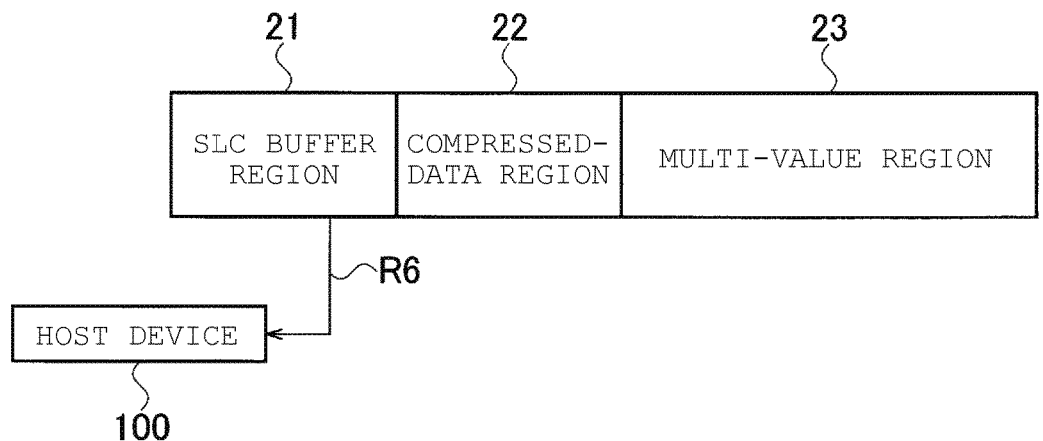
FIG. 8 is a schematic view for illustrating a read operation of the memory system according to the embodiment (first view)

When the CPU 11 determines that the write data is stored in the SLC buffer region 21 by referring to the logical address designated by the read request, the read data is transmitted to the host device 100 by reading data from the SLC buffer region 21, as illustrated by a data transfer path R6 in FIG. 8, under the control of the CPU 11. The read operation in this case is the same as the read operation for data written in the NAND flash memory by the SLC method.

When the CPU 11 determines that the write data is stored in the compressed-data region 22 by referring to the logical address designated by the read request, the compressed unit data is read from the compressed-data region 22 under the control of the CPU 11. The CPU 11 may select compressed unit data to be read by referring to the logical-to-physical address conversion table 31 and the compressed-data address table 33. That is, the CPU 11 refers to the logical-to-physical address conversion table 31 and acquires the index IND of the compressed-data address table 33 corresponding to the logical address designated by the read request. Then, using the acquired index IND, the CPU 11 acquires the top physical address and data length of the compressed unit data from the compressed-data address table 33, and reads the compressed unit data from the compressed-data region 22.

Figure 9:
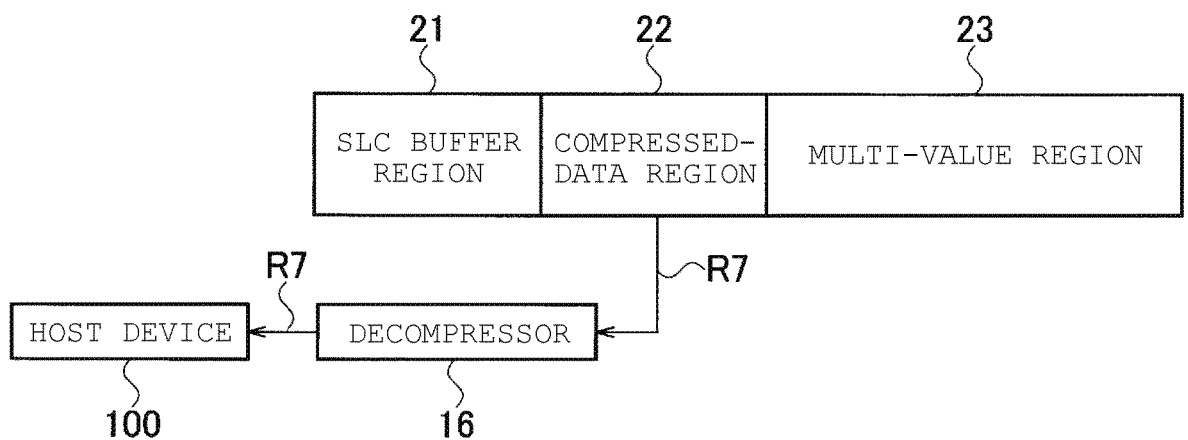
FIG. 9 is a schematic view for illustrating the read operation of the memory system according to the embodiment (second view)
Figure 10:
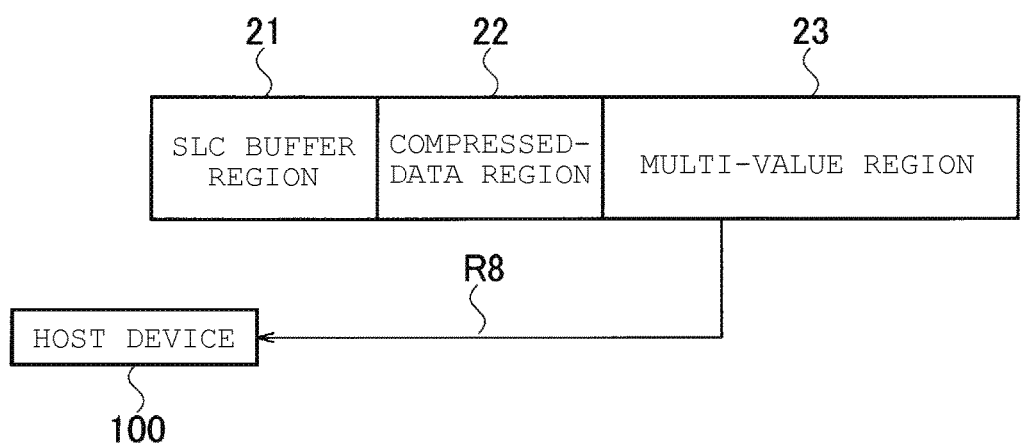
FIG. 10 is a schematic view for illustrating the read operation of the memory system according to the embodiment (third view)

The compressed unit data read from the compressed-data region 22 is transmitted to the decompressor 16 and is decompressed by the decompressor 16 as illustrated by a data transfer path R7 in FIG. 9. Then, the CPU 11 selects data to be read from a plurality of pieces of write data constituting the unit data. The CPU 11 transmits the selected data to the host device 100. Since the compressed unit data is written in the sequential area of the compressed-data region 22, the CPU 11 may select read data from the plurality of pieces of write data obtained by decompressing the compressed unit data.

When the CPU 11 determines that the write data is stored in the multi-value region 23 by referring to the logical address designated by the read request, the read data is transmitted to the host device 100 by reading data from the multi-value region 23, as illustrated as a data transfer path R8 in FIG. 10, under the control of the CPU 11. The read operation in this case is the same as the read operation for data written in the multilevel NAND flash memory.

Next, a read operation of the memory system 1 will be described with reference to a flowchart of FIG. 11 illustrating a flow of the read operation. When the memory system 1 receives the read request from the host device 100 in step S201 of FIG. 11, the CPU 11 determines which area of the NAND flash memory the data to be read is stored by referring to the logical-to-physical address conversion table 31 in step S202. That is, when the logical address designated by the read request corresponds to the physical address allocated to the SLC buffer region 21, it is determined that data to be read is written in the SLC buffer region 21. When the logical address designated by the read request corresponds to the index designating the compressed-data address table 33, it is determined that the data to be read is written to the compressed-data region 22 as at least a part of the compressed unit data. When the logical address designated by the read request corresponds to the physical address allocated to the multi-value region 23, it is determined that the data to be read is written in the multi-value region 23.

When the data to be read is written in the SLC buffer region 21, the process proceeds to step S203. In step S203, as described with reference to FIG. 8, the read data read from the SLC buffer region 21 is transmitted to the host device 100.

When data to be read is written in the compressed-data region 22 as at least a part of the compressed unit data, the process proceeds from step S202 to step S204. In step S204, the compressed unit data containing the read data is read from the compressed-data region 22. Thereafter, the process proceeds to step S205.

In step S205, the compressed unit data read from the compressed-data region 22 is transmitted to the decompressor 16 and decompressed as described with reference to FIG. 9. Then, in step S206, the read data is selected from the plurality of pieces of write data constituting the unit data. Next, in step S207, the selected read data is transmitted to the host device 100.

When data to be read is written in the multi-value region 23, the process proceeds from step S202 to step S208. In step S208, as described with reference to FIG. 10, the read data read from the multi-value region 23 is transmitted to the host device 100.

As described above, in the memory system 1, the data written in the SLC buffer region 21 and the multi-value region 23 is in a state of not being compressed and thus, the data is transmitted to the host device 100 without being subjected to data decompression processing. On the other hand, the data written in the compressed-data region 22 is decompressed and then transmitted to the host device 100.

For example, the size of the compressed-data region 22 is about 10 to 20% of the entire NAND flash memory 20. However, the sizes of the SLC buffer region 21 and the compressed-data region 22 may not be fixed. That is, the ratio of the size of the SLC buffer region 21 and the size of the compressed-data region 22 to the size of the entire NAND flash memory 20 may be changed dynamically according to the compression rate of the compressed unit data stored in the compressed-data region 22 and the size of the free area of the SLC buffer region.

For example, when the compression rate of compressed unit data is high and compression effect is large, the controller 10 enlarges the size of the compressed-data region 22 and reduces the size of the SLC buffer region 21. On the other hand, when the compression effect is small, the controller 10 reduces the size of the compressed-data region 22 and enlarges the SLC buffer region 21. As described above, the memory system 1 can write data to the NAND flash memory 20 suitable for an access pattern from the host device 100 according to write data by dynamically changing the sizes of the SLC buffer region 21 and the compressed-data region 22.

As described above, in the memory system 1 according to the embodiment, movement of data from the SLC buffer region to the multi-value region 23 is performed via the compressed-data region 22. That is, by compressing and collectively writing a plurality of pieces of write data to the compressed-data region 22, the time required for writing is shorter than when writing non-compressed write data to the multi-value region 23. Accordingly, in the memory system 1, speed at which the free area is generated in the SLC buffer region 21 is faster than a case where the write data is moved from the SLC buffer region 21 to the multi-value region 23 without being compressed. As a result, frequency of shortage of the free area in the SLC buffer region 21 is reduced. Therefore, according to the memory system 1 according to the embodiment, it is possible to provide a memory system in which a part of the NAND flash memory of the multi-value method is used for the SLC buffer and write performance is improved.

Furthermore, in the memory system 1 according to the embodiment, when write data is written to the SLC buffer region 21, each compression rate of the write data is calculated. As such, by calculating the compression rate of the write data in advance, it is possible to select compressible data and move the data from the SLC buffer region 21 to the compressed-data region 22. With this configuration, the compressed-data region 22 can be used more efficiently.

In the memory system 1 according to the embodiment, when data is written to the SLC buffer region 21, data compression is not performed, and the write data is written to the SLC buffer region 21 in a non-compressed state. In contrast, a memory system (hereafter, referred to as a "memory system of a comparative example") in which data is compressed and the compressed data is written to the SLC buffer region when writing to the SLC buffer region may be considered. According to the memory system of the comparative example, an amount of data that can be written to the SLC buffer is increased. For that reason, it is considered that frequency of the shortage of the free area of the SLC buffer region can be reduced.

On the other hand, in the memory system of the comparative example described above, processing of logical-to-physical address conversion is complicated by arranging write data having a variable length in a fixed length addressing unit. When data is written to the SLC buffer region without being subjected to compression, one logical cluster is arranged per physical cluster, but when data is subjected to compression, two or more logical clusters are arranged per physical cluster. In order to address this, it is necessary to store addresses of the logical clusters at a finer granularity (for example, one-half cluster granularity, one-fourth cluster granularity, ... ). When a compressed logical cluster crosses physical cluster boundaries, it is necessary to refer to two or more physical clusters.

In contrast, in the memory system 1 according to the embodiment, the write data is written in the SLC buffer region 21 without being compressed. Then, the memory system 1 compresses the data written to the SLC buffer region 21 at the timing when the free area of the SLC buffer region 21 decreases, and moves the data to the compressed-data region 22. In this case, the compressed unit data is written to the sequential area of the compressed-data region 22. Therefore, according to the memory system 1, the problem described above of the memory system of the comparative example does not occur. Thereafter, the compressed unit data stored in the compressed-data region 22 is decompressed at a timing that does not disturb access from the host device 100 as much as possible, and the write data is written to the multi-value region 23.

In the memory system 1 according to the embodiment, since a plurality of pieces of write data are collectively compressed, it is necessary to read all the compressed unit data according to a read request. For that reason, in order to prevent a decrease in read performance, the unit of write data to be compressed at one time may be reduced to some extent. Alternatively, a compressed data format capable of being subjected to random access may be adopted.

However, the shortage of the free area in the SLC buffer region 21 is a situation where the write request is superior to the read request. For that reason, even if there is a decrease in the read performance due to reading all of the compressed unit data according to a read request, the number of read operations is small and thus, the influence by compression of the write data on read performance is small. By writing compressed unit data obtained by collectively compressing a plurality of pieces of write data to the compressed-data region 22 and addressing the written data in units of compressed unit data, it is possible to prevent an increase in the memory area required for addressing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system for use with a host device, comprising:
    a nonvolatile semiconductor memory including a first area, a second area, and a third area; and
    a controller configured to:
        write data received from the host device to the first area by storing 1-bit data per memory cell;
        at a first timing, read at least a part of the data stored in the first area to generate one unit data, compress the unit data, and write the compressed unit data to the second area; and
        at a second timing, read the compressed unit data from the second area, decompress the read compressed unit data, and write the decompressed unit data to the third area by storing a plurality of bits of data per memory cell.

2. The memory system according to claim 1, wherein the controller is further configured to determine the first timing based on an amount of area free in the first area.

3. The memory system according to claim 1, wherein the controller is further configured to determine the second timing based on an access frequency from the host device.

4. The memory system according to claim 1, further comprising:

a compressed-data address table in which a logical address of the data constituting the compressed unit data is registered.

5. The memory system according to claim 1, wherein at least a portion of the compressed unit data is written to a continuous sequential area designated by one data size and one physical address of the second area.

6. The memory system according to claim 1, further comprising:
a compression rate information storage unit that stores compression rate information on individual compression rates for the data to be written to the first area, wherein
the controller is configured to use the compression rate information to generate the unit data in an order according to the relatively higher compression rate information.

7. The memory system according to claim 6, wherein sizes of the second area and the first area are changed according to the compression rate of the compressed unit data written to the second area and a size of the free area of the first area.

8. A method, comprising:
receiving, from a host device, a request to write data to a nonvolatile semiconductor memory that includes a first area, a second area, and a third area;
determining whether a free area in the first area satisfies an allowable value;
writing, based on the determination, the data either to the first area of the nonvolatile semiconductor memory by storing 1-bit data per memory cell or to the third area of the nonvolatile semiconductor memory by storing a plurality of bits of data per memory cell;
determining a first timing to read at least a part of the data stored in the first area to generate one unit data, compress the unit data;
writing the compressed unit data to the second area; and
determining second timing to read the compressed unit data from the second area, decompress the read compressed unit data, and write the decompressed unit data to the third area by storing a plurality of bits of data per memory cell.

9. The method of claim 8, wherein the first timing is determined based on the free area in the first area satisfying the allowable value.

10. The method of claim 8, wherein the second timing is determined based on an access frequency from the host device.

* * * * *